Figure 1:
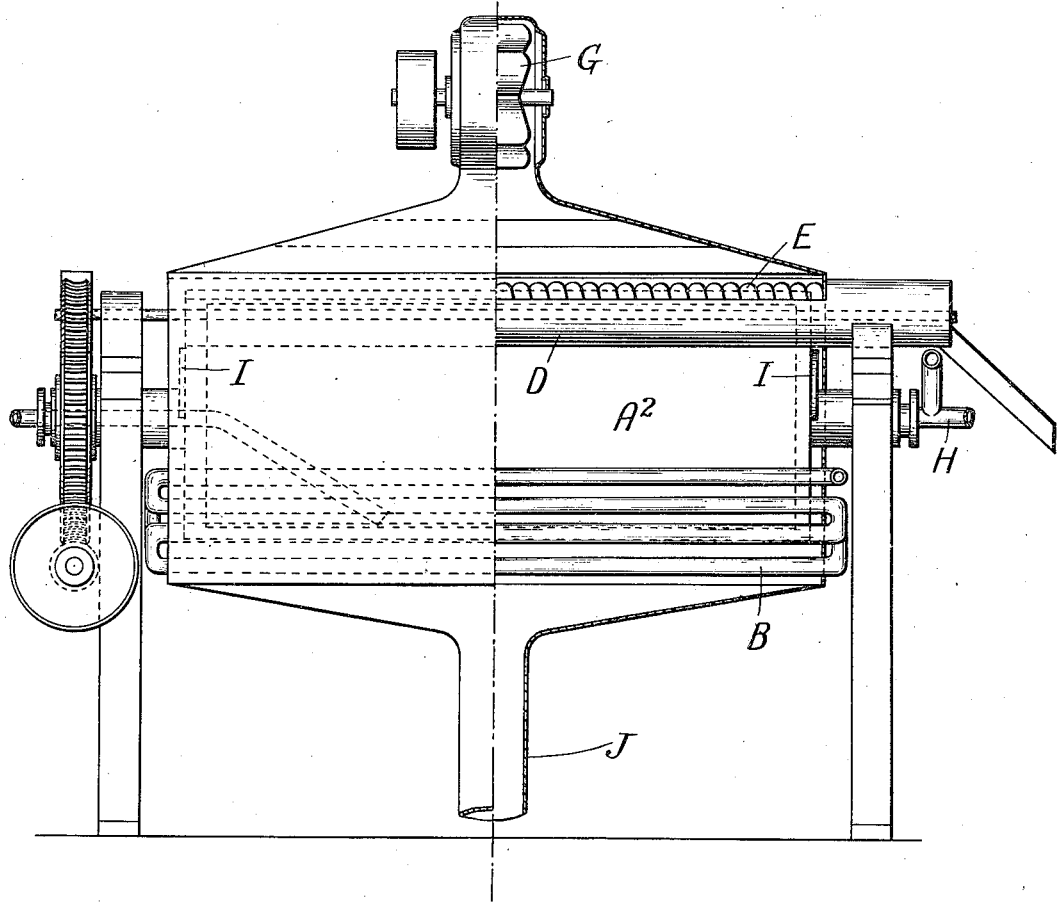

J. KUNICK.
ART OF DRYING LIQUIDS.
APPLICATION FILED JUNE 11, 1906.

1,012,866.

Patented Dec. 26, 1911.
2 SHEETS—SHEET 1.

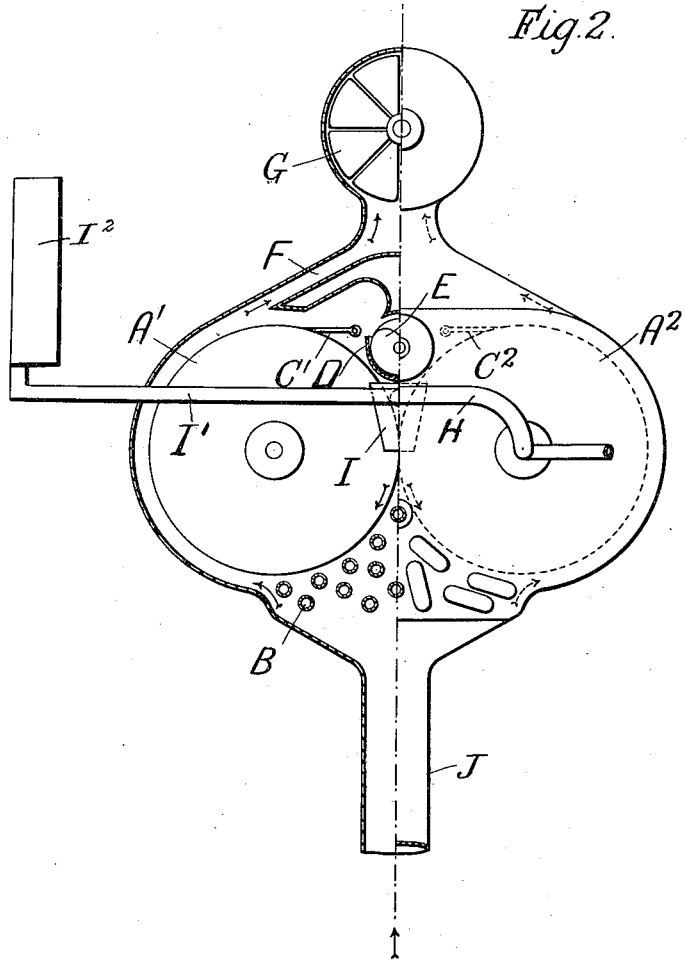

UNITED STATES PATENT OFFICE.

JOHANNES KUNICK, OF BERLIN, GERMANY.

ART OF DRYING LIQUIDS.

1,012,866.  Specification of Letters Patent.  Patented Dec. 26, 1911.

Application filed June 11, 1906. Serial No. 321,199.

*To all whom it may concern:*

Be it known that I, JOHANNES KUNICK, a subject of the Emperor of Germany, and resident of Berlin, Germany, have invented a certain new and useful Improvement in the Art of Drying Liquids for the Purpose of Obtaining the Solid Substances Therein Contained, of which the following is a specification.

The drying of liquid substances is frequently effected on heated drums or cylinders which revolve in the liquid or on which it is spread out in a thin layer by suitable mechanical means. But in order to insure not merely condensation, but rapid evaporation in, say 10 or 15 seconds, of all the moisture contained in a liquid, the drum must be brought to a high temperature. High temperatures, *i. e.* temperatures of 212°. F. (or 100° C.) or thereabout, are, frequently, injurious to the solid matter contained in liquids, especially sugar, albumin and similar substances. Liquids containing such substances should therefore be dried at lower temperatures, and this is only feasible, with any rapidity at all, by the processes heretofore in use, by evaporation *in vacuo*. But drying *in vacuo*, as usually effected, is still a slow and expensive process, and so far no machine appears to have been in use which allows of the continued rapid drying of liquids *in vacuo*, and the removal of the residue, also continuously, in a completely dry state. On the other hand there is hardly any liquid the constituent parts of which could not be exposed, for a very short time, to temperatures in excess of those generally employed in vacuum processes, viz. 105° to 120° F. (40° to 48° C.) without being injuriously affected thereby. To mention an example, the proteids of milk are not injuriously affected by being exposed for a few seconds to temperatures as high as 170° to 180° F. (76° to 82° C.) whereas on exposure to higher temperatures such as 190° to 212° F. (88° to 100° C.) even for a still smaller number of seconds, they are liable to change.

I have therefore devised means for obtaining rapid and complete evaporation, or rather vaporization, at temperatures considerably below the boiling point, or below the point at which the solid constituents would be injuriously affected, but with simpler and less expensive apparatus and at a relatively small cost as compared with the vacuum pan process.

In the accompanying drawings, which illustrate an appartus by which the invention may be carried into effect, Figures 1 and 2 are vertical, partial sections, at right angles to each other.

Referring to the drawings, the apparatus therein shown comprises a suitable jacket or casing to form a chamber within which are preferably mounted two internally heated cylinders $A'$ and $A^2$ which are preferably closely adjacent to each other, so as to form between them, at their upper sides, a suitable trough or space to contain the liquid to be evaporated and which trough or space is closed by end plates I. The liquid to be evaporated will be fed to the said trough or space by a pipe, as $I'$, connected with a supply tank or vessel, as $I^2$. These cylinders $A'$ and $A^2$ are driven in any suitable manner as by the gearing shown at the left of Fig. 1, said cylinders being heated by steam entering at the pipe H. In the arrangement shown these cylinders are rotated inward toward each other at their tops, and scraping knives or doctors $C'$, $C^2$ are provided to scrape off the dried or evaporated material from the rotating cylinders and to discharge such dried or evaporated material into a trough D from which it is removed by means of a helix or conveyer E, or in any other suitable manner. The chamber in which the evaporating cylinders are arranged is provided with an air inlet J and the lower part of such chamber is preferably furnished with steam pipes or tubes B by which the entering air can be heated.

At the top of the chamber is arranged a suction fan or exhauster G by which the air entering at the inlet J will be drawn rapidly through the chamber, and over the surfaces of the rotating cylinders $A'$ and $A^2$, and thence through the outlets F to the said suction fan or exhauster. The exhaust fan G is, or may be, of the usual construction, open on one side for the discharge of air. The jacket or casing, forming the evaporating chamber, is of such shape as to conform as closely as possible to the shape of the cylinders, as shown in Fig. 2, so as to provide limited spaces or contracted passageways adjacent to and partly surrounding the faces of the cylinders and closed at their ends, and through which spaces or ducts the air is sucked and thereby more or less rarefied to expedite the evaporating action.

As the cylinders rotate they will carry downward thin films of the liquid to be evaporated, and the heated air drawn through the evaporating chamber and in contact with the rotating evaporating rolls will quickly dry or evaporate the liquid substance leaving thin films of dried material to be removed by the scrapers or doctors C' and C². By thus providing means for sucking a current of air through the evaporating chamber, and thus rarefying the air of said chamber, the liquid substances to be dried may be evaporated quickly at relatively low temperatures; so that it is not necessary to heat the cylinders to temperatures higher than are usually employed in vacuum pans, while at the same time, with the assistance of the rapidly moving currents of rarefied air, the liquids can be quickly evaporated.

I am aware that currents of air have previously been used in connection with the drying of liquids on heated cylinders, but in these cases the object of the air currents was entirely different from the object I have in view. The purpose was either merely to carry the steam produced by evaporation of the liquid away out of the room, or, in other cases, where blasts of hot air were used, the object was to carry off the steam, and, simultaneously, to blow hot air on to the substance to be dried. The distinguishing feature of this process, however, is the simultaneous application of temperatures below 212° F. (or 100° C.) which are in themselves insufficient to produce rapid evaporation, and the rarefaction of the air all over the thinly extended liquid.

Having now described my invention what I claim and desire to secure by Letters Patent of the United States is:—

The herein described method of extracting, in dry form, from liquids, solid substances contained therein, consisting in spreading the liquid in a thin film on the surface of a cylinder, rotating the cylinder continuously, heating the cylinder internally, sucking a current of air through a contracted passageway partly surrounding said cylinder so as to cause the air current to flow over the entire surface of the film of liquid and with such suctional force as greatly to rarefy the same, and so controlling the temperature of the cylinder-surface and the temperature and velocity of the air current that practically all moisture is evaporated during one revolution of the cylinder and the resultant temperature given to the liquid during this drying operation by the cylinder and the air current being such that the substance being evaporated will remain below 100° C. (212° F.).

In testimony whereof I have signed my name to this specification in the presence of two subscribing witnesses.

JOHANNES KUNICK.

Witnesses:
WOLDEMAR HAUPT,
HENRY HASPER.